United States Patent
Komatsu

(10) Patent No.: US 11,662,969 B2
(45) Date of Patent: May 30, 2023

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventor: Hiroaki Komatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/643,250

(22) Filed: Dec. 8, 2021

(65) Prior Publication Data

US 2023/0033777 A1 Feb. 2, 2023

(30) Foreign Application Priority Data

Aug. 2, 2021 (JP) .............................. JP2021-126967

(51) Int. Cl.
*G06F 3/12* (2006.01)

(52) U.S. Cl.
CPC .......... *G06F 3/1291* (2013.01); *G06F 3/1204* (2013.01); *G06F 3/1205* (2013.01); *G06F 3/1226* (2013.01); *G06F 3/1232* (2013.01); *G06F 3/1267* (2013.01); *G06F 3/1268* (2013.01)

(58) Field of Classification Search
None
See application file for complete search history.

(56) References Cited

U.S. PATENT DOCUMENTS

| 10,452,331 | B2 | 10/2019 | Murata |
| 2005/0105146 | A1* | 5/2005 | Tanaka ............... G03G 15/6508 358/498 |
| 2015/0002880 | A1* | 1/2015 | Hakamada ............. G06K 1/121 358/1.14 |
| 2018/0032298 | A1* | 2/2018 | Murata ................. G06F 3/1226 |

FOREIGN PATENT DOCUMENTS

JP 6656112 B2 3/2020

* cited by examiner

*Primary Examiner* — Frantz Bataille
(74) *Attorney, Agent, or Firm* — Sughrue Mion, PLLC

(57) ABSTRACT

An image forming apparatus includes a processor configured to: obtain a print job in which setting-tray information is registered, the setting-tray information describing a tray and being specified according to a configuration of a second image forming apparatus, the second image forming apparatus being different from the image forming apparatus; and execute the print job by applying tray information, the tray information corresponding to the setting-tray information of the print job and according with a configuration of the image forming apparatus.

20 Claims, 6 Drawing Sheets

FIG. 5

| USER ID | FILE NAME | TRAY INFORMATION | JOB SETTING DATE-AND-TIME |
|---|---|---|---|
| XXX | AAA.doc | PARENT APPARATUS TRAY 1 | 2021/6/30 12:00:00 |

FIG. 6

| CONFIGURATION INFORMATION OF PARENT APPARATUS | | | |
|---|---|---|---|
| TRAY NUMBER | SETTING SIZE | SETTING SHEET | UPDATE DATE AND TIME |
| TRAY 1 | A4 | PLAIN PAPER | 2021/01/01 12:00:00 |
| TRAY 2 | A4 | HIGH-QUALITY PAPER | |
| TRAY 3 | A3 | PLAIN PAPER | |
| ⋮ | ⋮ | ⋮ | |

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2021-126967 filed Aug. 2, 2021.

BACKGROUND

(i) Technical Field

The present disclosure relates to an image forming apparatus, a non-transitory computer readable medium, and an image forming method.

(ii) Related Art

Japanese Patent No. 6656112 discloses a print system. In the print system, a first image forming apparatus, which may be set as a child apparatus, and a second image forming apparatus, which may be set as a parent apparatus, are connected to different networks. The print system includes a user terminal which may be connected to the first image forming apparatus. The second image forming apparatus stores a print job received from the user terminal. The first image forming apparatus may use a print service for executing the stored print job. The user terminal includes an inquiry information transmission unit which transmits inquiry information to the first image forming apparatus. The first image forming apparatus includes a storage unit and an identification-information transmission controller. The storage unit stores identification information of the second image forming apparatus which is set as a parent apparatus. When inquiry information is received from the user terminal, if the print service is enabled and the first image forming apparatus is set as a child apparatus, the identification-information transmission controller transmits the identification information to the user terminal. The user terminal includes a print-job transmission unit which, when the identification information is received from the first image forming apparatus, transmits a print job to the second image forming apparatus indicated by the identification information.

A technique for multiple image forming apparatuses connected over a network has been proposed. In the technique, a parent apparatus, which receives a print job from a user, and child apparatuses, which may obtain the print job from the parent apparatus, are set. Thus, any image forming apparatus may execute the print job.

A print job may include specification of a second image forming apparatus (for example, a parent apparatus) which is to execute the print job, and information (hereinafter referred to as "tray information") about a tray specified according to the configuration of the second image forming apparatus.

However, the configuration of the second image forming apparatus may be different from that of a first image forming apparatus which executes the print job actually, and their trays corresponding to the tray information may have different types of sheets.

Therefore, when the first image forming apparatus, which has a configuration different from that of the second image forming apparatus, executes a print job in which tray information according to the configuration of the second image forming apparatus is registered, a result, which the user does not intend to obtain, may be output.

SUMMARY

Aspects of non-limiting embodiments of the present disclosure relate to provide an image forming apparatus, a non-transitory computer readable medium, and an image forming method which suppress output of a result, which a user does not intend to obtain, even when a first image forming apparatus, which has a configuration different from that of a second image forming apparatus, executes a print job in which tray information according to the configuration of the second image forming apparatus is registered.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: obtain a print job in which setting-tray information is registered, the setting-tray information describing a tray and being specified according to a configuration of a second image forming apparatus, the second image forming apparatus being different from the image forming apparatus; and execute the print job by applying tray information, the tray information corresponding to the setting-tray information of the print job and according with a configuration of the image forming apparatus.

BRIEF DESCRIPTION OF THE DRAWINGS

Exemplary embodiments of the present disclosure will be described in detail based on the following figures, wherein:

FIG. 5 is a diagram illustrating exemplary print job information according to the exemplary embodiments;

FIG. 6 is a diagram illustrating exemplary configuration information of a parent apparatus according to the exemplary embodiments;

DETAILED DESCRIPTION

First Exemplary Embodiment

Figure 1:
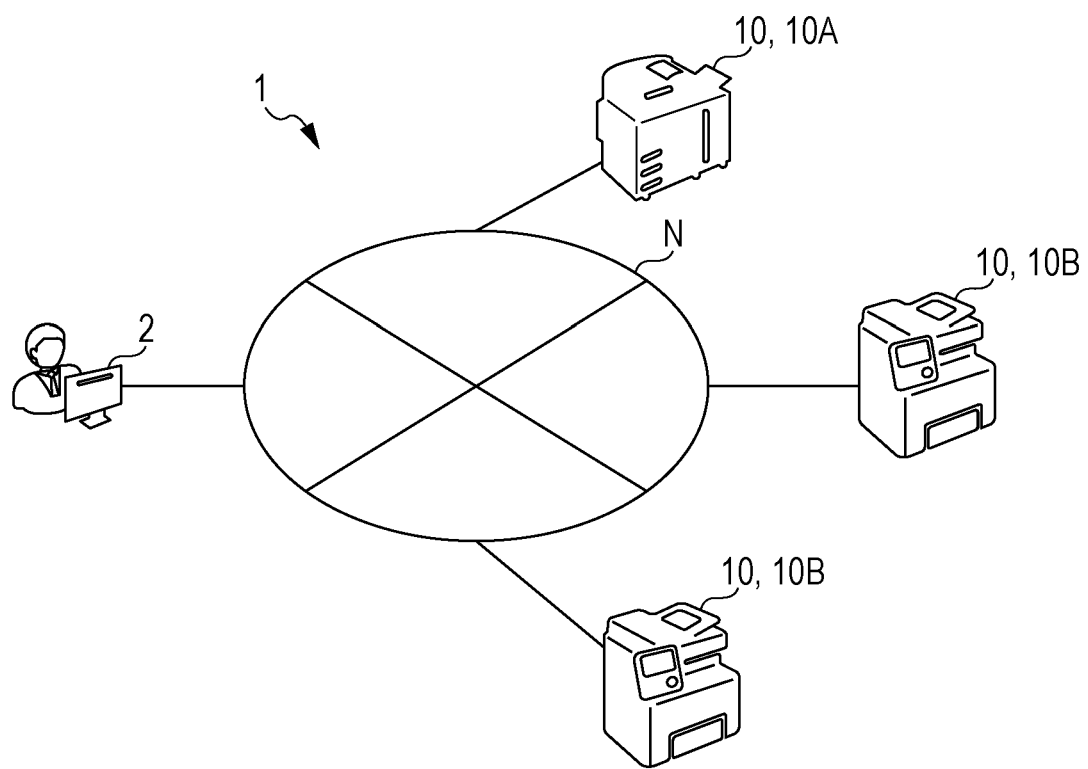
FIG. 1 is a schematic diagram illustrating an exemplary configuration of an image forming system according to exemplary embodiments.

By referring to the drawings, exemplary embodiments of the present disclosure will be described in detail below. FIG.

1 is a schematic diagram illustrating an exemplary configuration of an image forming system 1 according to a first exemplary embodiment.

For example, as illustrated in FIG. 1, the image forming system 1 has a configuration in which a terminal 2, which is operated by a user, and multiple image forming apparatuses 10 are connected to each other over a network N. The image forming apparatuses 10 include an image forming apparatus (hereinafter referred to as a "parent apparatus") 10A, which serves as a parent apparatus, and image forming apparatuses (hereinafter referred to as "child apparatuses") 10B, which serve as child apparatuses.

The terminal 2 is a device, such as a personal computer or a tablet computer, which is operated by a user to set a print job and transmit the print job to an image forming apparatus 10. A print job according to the first exemplary embodiment includes file data, which is to be printed, and information (hereinafter referred to as "setting information") about settings used in printing.

The parent apparatus 10A is an image forming apparatus which obtains, for storage, a print job transmitted by a user, and executes the print job in response to the user's instruction to do the print job. The parent apparatus 10A transmits a print job to a child apparatus 10B in response to a request for the print job.

In response to a user's instruction to do a print job, a child apparatus 10B obtains the print job, which has been transmitted by the user, from the parent apparatus 10A, and executes the obtained print job.

A form of the image forming system 1 according to the first exemplary embodiment, in which the parent apparatus 10A stores a print job transmitted by a user and an image forming apparatus 10 (the parent apparatus 10A or a child apparatus 10B), to which the user gives an instruction to do the print job, executes the print job, will be described. For example, when a user instructs the parent apparatus 10A to do a print job, the parent apparatus 10A executes the print job of the user, which is stored in the parent apparatus 10A. When a user instructs a child apparatus 10B to do a print job, the child apparatus 10B obtains the print job of the user from the parent apparatus 10A, and executes the print job. The parent apparatus 10A is an exemplary "second image forming apparatus", and the child apparatus 10B is an exemplary "image forming apparatus" in the claims. The case in which a child apparatus 10B executes a print job will be described below.

Figure 2:
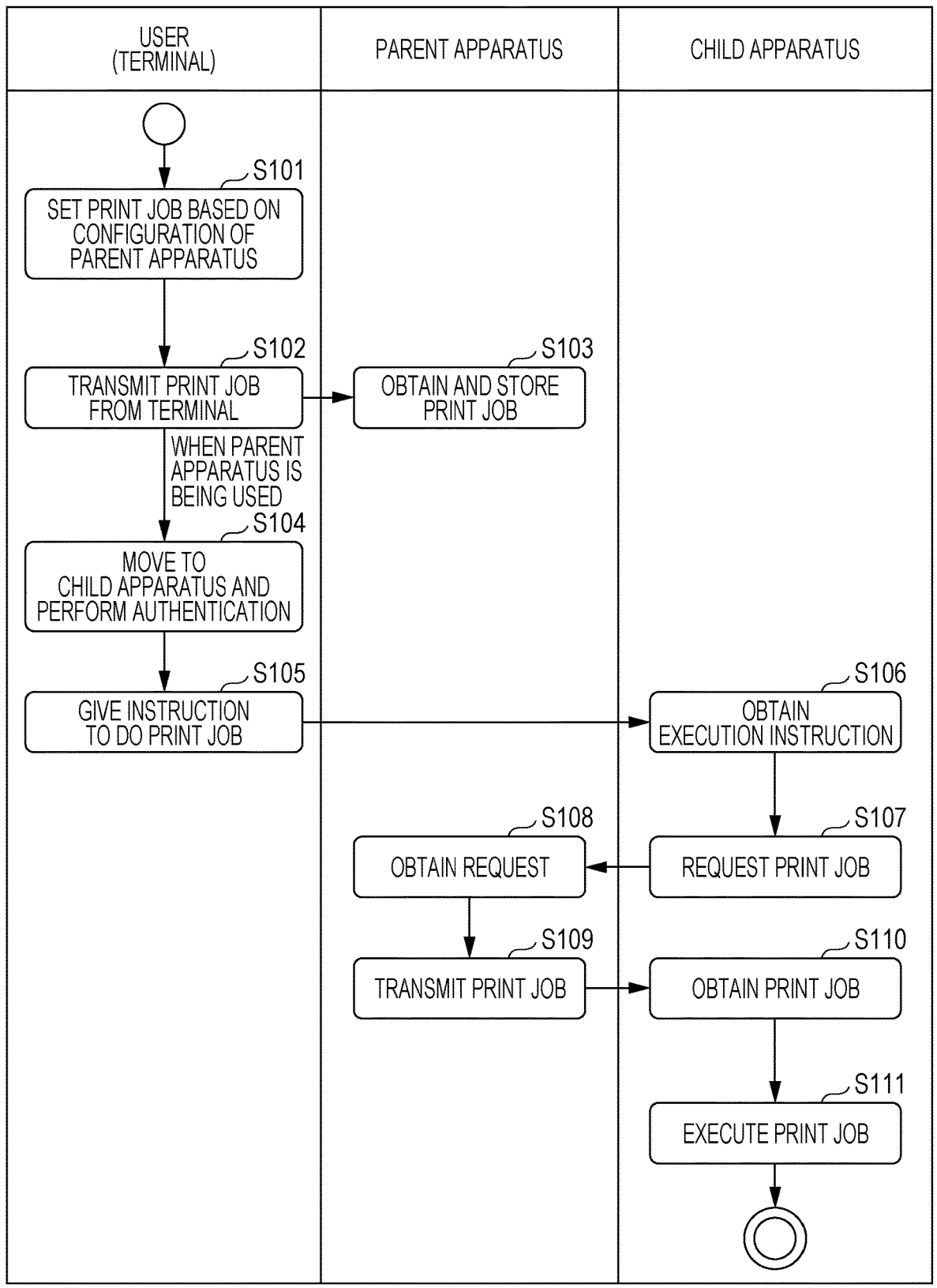
FIG. 2 is an activity diagram illustrating an exemplary flow in which a child apparatus executes a print job stored in a parent apparatus, according to the exemplary embodiments.

By referring to FIG. 2, a flow in which a child apparatus 10B executes a print job, which has been transmitted to the parent apparatus 10A by a user, will be described. FIG. 2 is an activity diagram illustrating an exemplary flow in which a child apparatus 10B executes a print job obtained from the parent apparatus 10A.

For example, as illustrated in FIG. 2, a user sets a print job on the basis of the configuration (for example, a setting in which tray 1 of the parent apparatus 10A holds A4 sheets) of the parent apparatus 10A (step S101). The user transmits, to the image forming apparatus 10, the print job which has been set by using the terminal 2 being operated by the user (step S102).

The parent apparatus 10A obtains, for storage, the print job transmitted from the user (step S103).

After transmission of the print job, the user moves to a child apparatus 10B, performs a user authentication on the child apparatus 10B (step S104), and operates the child apparatus 10B to instruct the child apparatus 10B to do the transmitted print job (step S105).

The child apparatus 10B obtains the instruction to do the print job (step S106), and requests the print job from the parent apparatus 10A (step S107).

When the parent apparatus 10A obtains the request for the print job (step S108), the parent apparatus 10A transmits the stored print job to the child apparatus 10B (step S109).

The child apparatus 10B obtains the print job from the parent apparatus 10A (step S110), and executes the obtained print job (step S111).

As described above, in execution of a print job, the print job is obtained from the parent apparatus 10A storing the print job. Thus, a user may do a print job by using any of the image forming apparatuses 10 without being conscious of whether the image forming apparatus 10 is the parent apparatus 10A or a child apparatus 10B. For example, a user planned to make the parent apparatus 10A do a print job. However, when the parent apparatus 10A is being used, the user may make a child apparatus 10B do the print job.

A description will be made below about a method in which, even when a print job, which is set on the basis of the configuration of the parent apparatus 10A, is executed by a child apparatus 10B, an execution result, which is substantially the same as the case in which a print job is executed by the parent apparatus 10A, is obtained.

Figure 3:
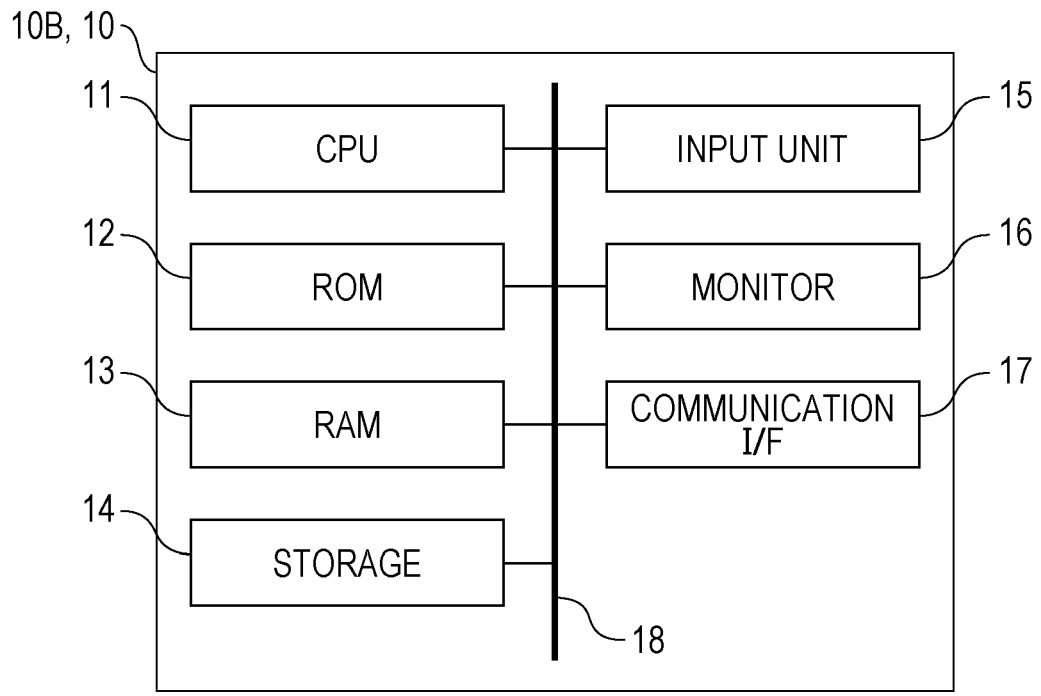
FIG. 3 is a block diagram illustrating an exemplary hardware configuration of an image forming apparatus according to the exemplary embodiments.

By referring to FIG. 3, the hardware configuration of a child apparatus 10B (image forming apparatus 10) will be described. FIG. 3 is a block diagram illustrating an exemplary hardware configuration of a child apparatus 10B according to the first exemplary embodiment.

As illustrated in FIG. 3, a child apparatus 10B according to the first exemplary embodiment includes a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to each other through a bus 18. The CPU 11 is an exemplary processor.

The CPU 11 controls the entire child apparatus 10B. The ROM 12 is used to store, for example, various programs, including an image forming program used in the first exemplary embodiment, and data. The RAM 13 is a memory used as a work area in execution of various programs. The CPU 11 loads programs, which are stored in the ROM 12, on the RAM 13 for execution. Thus, the CPU 11 executes a print job by applying tray information which corresponds to the tray information of the print job and which accords with the configuration of the child apparatus 10B. The storage 14 is, for example, a hard disk drive (HDD), a solid state drive (SSD), or a flash memory. The storage 14 may store, for example, the image forming program. Examples of the input unit 15 include a touch panel and a keyboard which receive, for example, input of characters. The monitor 16 displays characters and images. The communication I/F 17 receives/transmits data.

Figure 4:
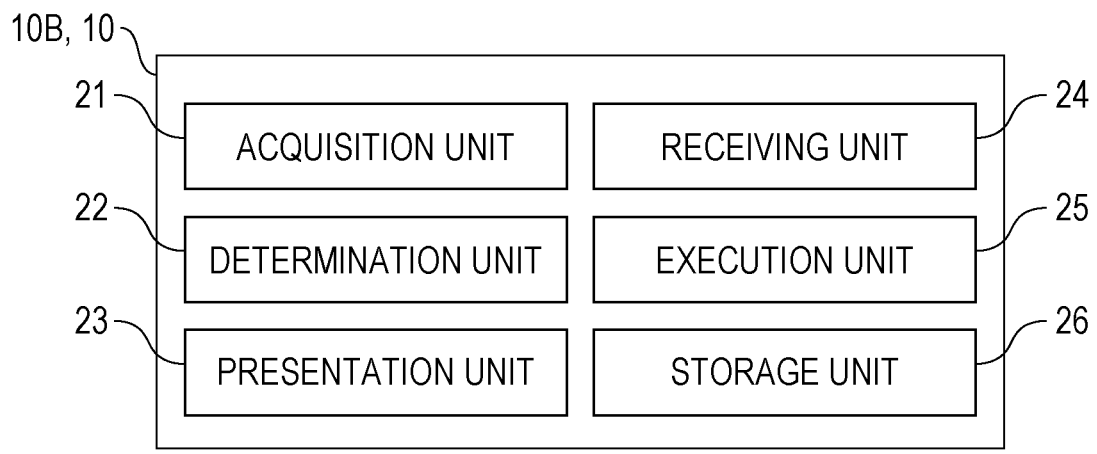
FIG. 4 is a block diagram illustrating an exemplary functional configuration of an image forming apparatus according to a first exemplary embodiment.

By referring to FIG. 4, the functional configuration of a child apparatus 10B will be described. FIG. 4 is a block diagram illustrating an exemplary functional configuration of a child apparatus 10B according to the first exemplary embodiment.

For example, as illustrated in FIG. 4, a child apparatus 10B includes an acquisition unit 21, a determination unit 22, a presentation unit 23, a receiving unit 24, an execution unit 25, and a storage unit 26. The CPU 11, which executes the image forming program, functions as the acquisition unit 21, the determination unit 22, the presentation unit 23, the receiving unit 24, the execution unit 25, and the storage unit 26.

The acquisition unit 21 acquires a print job, which is stored in the parent apparatus 10A, information (hereinafter referred to as "configuration information"), which indicates the currently set configuration of the trays of the parent apparatus 10A, and configuration information (hereinafter referred to as "before-change configuration information") of the parent apparatus 10A which was set before a change.

A print job according to the first exemplary embodiment includes setting information. For example, as illustrated in FIG. 5, the setting information includes a user identification (ID), a file name, tray information, and a job setting date-and-time. The user ID is information for identifying a user. The file name is the name of file data to be printed. The tray information indicates the image forming apparatus 10 (parent apparatus 10A), which is specified by the user, and the number of the tray of the image forming apparatus 10 (parent apparatus 10A). The job setting date-and-time is a date and time at which the user set the print job and transmitted the print job to the parent apparatus 10A. In the first exemplary embodiment, the case in which a user specifies an image forming apparatus 10 is described. However, the case is not limited to this. An image forming apparatus 10, which is frequently used by a user (that is, whose frequency of use is the highest), may be set as the specified image forming apparatus 10.

For example, as illustrated in FIG. 6, the configuration information according to the first exemplary embodiment includes the tray number, the setting size, the setting sheet, and the update date and time. The tray number is a number for identifying a tray installed in the parent apparatus 10A. The setting size is the size of sheets held in each tray. The setting sheet is the type of sheets held in each tray. The update date and time is a date and time at which the configuration of the image forming apparatus 10 was changed and the configuration information was updated.

The determination unit 22 determines whether tray information is registered in the setting information included in an obtained print job. If tray information is registered in the setting information, the acquisition unit 21 acquires the configuration information. If tray information is not registered in the setting information, the execution unit 25 described below executes the print job.

The determination unit 22 compares the job setting date-and-time of a print job with the update date and time of the obtained configuration information, and determines whether the configuration of the parent apparatus 10A has been changed after transmission of the print job. If the update date and time of the obtained configuration information is later than the job setting date-and-time of the print job, the determination unit 22 determines that the configuration of the parent apparatus 10A has been changed after transmission of the print job. If the determination unit 22 determines that the configuration of the parent apparatus 10A has been changed after transmission of the print job, the before-change configuration information is obtained from the parent apparatus 10A as the configuration information obtained from the parent apparatus 10A.

The determination unit 22 determines whether the obtained configuration information or before-change configuration information corresponds to the configuration of the child apparatus 10B. If the configuration of the parent apparatus 10A, which is indicated by the obtained configuration information, matches the configuration the child apparatus 10B, the determination unit 22 determines that the obtained configuration information or before-change configuration information corresponds to the configuration of the child apparatus 10B.

In the first exemplary embodiment, the case in which, if the obtained configuration information (the configuration of the parent apparatus 10A) matches the configuration of the child apparatus 10B, it is determined that the obtained configuration information corresponds to the configuration of the child apparatus 10B is described. However, the case is not limited to this. If the specified tray information in the obtained configuration information (the configuration of the parent apparatus 10A) matches that in the configuration of the child apparatus 10B, it may be determined that the obtained configuration information corresponds to the configuration of the child apparatus 10B. For example, as illustrated in FIG. 5, when the tray information is set to "parent apparatus tray 1", if the "setting size" and the "setting sheet" of tray 1 in the obtained configuration information (parent apparatus 10A) matches the "setting size" and the "setting sheet" of tray 1 in the configuration of the child apparatus 10B, it is determined that the obtained configuration information corresponds to the configuration of the child apparatus 10B.

If the obtained configuration information or before-change configuration information does not correspond to the configuration of the child apparatus 10B, the determination unit 22 determines whether the setting may be changed so as to correspond with the specified tray information by using the configuration of the child apparatus 10B. When "parent apparatus tray 1" is set in the tray information, the determination unit 22 determines whether the "setting size" and the "setting sheet", which are the same as the "setting size" and the "setting sheet" of tray 1 in the configuration information (parent apparatus 10A), are set in the child apparatus 10B. If the same "setting size" and "setting sheet" are set, the determination unit 22 determines that the setting in the tray information may be changed, and changes the tray information of the print job to the tray number of the child apparatus 10B, for which the same "setting size" and "setting sheet" are set.

When the obtained configuration information or before-change configuration information does not correspond to the configuration of the child apparatus 10B, if the setting fails to be changed so as to correspond with the specified tray information, the presentation unit 23 makes a presentation, for notification, which indicates that the configuration of the child apparatus 10B does not correspond to the tray information of the print job. Specifically, the presentation unit 23 displays, for notification, a message that the configuration of the child apparatus 10B does not correspond to the tray information, on the monitor 16.

When the obtained configuration information or before-change configuration information does not correspond to the configuration of the child apparatus 10B, if the setting fails to be changed so as to correspond with the specified tray information, the presentation unit 23 presents the tray information of the print job and the tray configuration information of the child apparatus 10B. Specifically, the presentation unit 23 displays the tray information of the print job and the configuration of the trays of the child apparatus 10B as well as a message for prompting a user to change the tray information.

The receiving unit 24 receives a tray number selected by a user from the tray configuration of the child apparatus 10B which is displayed by the presentation unit 23. The receiving unit 24 registers the received tray number in the tray information of the print job to change the tray information.

The execution unit 25 executes a print job by applying tray information which corresponds to the tray information of the print job and which accords with the configuration of the child apparatus 10B. Specifically, when tray information is registered in the setting information of the print job, the execution unit 25 applies the tray information of the print job to the file data of the print job, and executes the job.

For example, when the obtained configuration information or before-change configuration information corresponds to the configuration of the child apparatus 10B, the execution unit 25 executes the print job by applying the tray information of the print job.

When the obtained configuration information or before-change configuration information does not correspond to the configuration of the child apparatus 10B, if the setting may be changed so as to correspond with the specified tray information, the execution unit 25 executes the print job by changing the tray information to the corresponding tray number of the child apparatus 10B.

When the obtained configuration information or before-change configuration information does not correspond to the configuration of the child apparatus 10B, if the setting fails to be changed so as to correspond with the specified tray information, the execution unit 25 executes the print job by applying the tray number received by the receiving unit 24.

When tray information is not registered, the execution unit 25 executes the print job by applying a setting (for example, the sheet size "A4" and the setting sheet "plain paper") predetermined in the image forming apparatus 10.

The storage unit 26 stores the print job, the configuration information, and the before-change configuration information which are acquired by the acquisition unit 21. When the configuration of the child apparatus 10B is to be changed, the storage unit 26 stores the before-change configuration information of the configuration of the child apparatus 10B. In response to a request from a different image forming apparatus 10 other than the child apparatus 10B, the stored before-change configuration information is transmitted to the different image forming apparatus 10.

Figure 7:
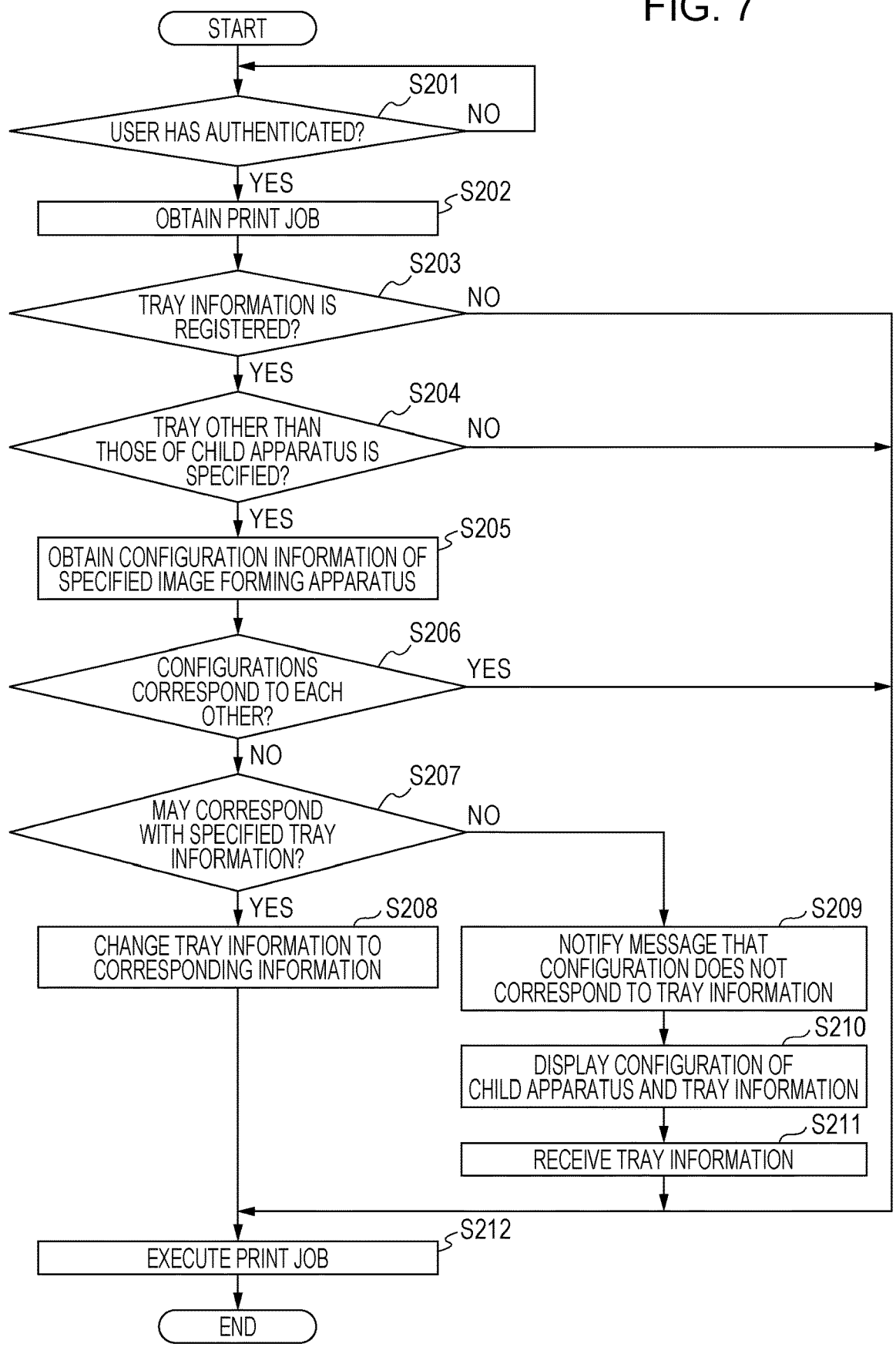
FIG. 7 is a flowchart of an exemplary process of executing a print job, according to the first exemplary embodiment.

By referring to FIG. 7, the operation of a child apparatus 10B (image forming apparatus 10) according to the first exemplary embodiment will be described. FIG. 7 is a flowchart of an exemplary process of executing a print job, according to the first exemplary embodiment. The CPU 11 reads the image forming program from the ROM 12 or the storage 14 for execution. Thus, the image forming process illustrated in FIG. 7 is performed. The image forming process illustrated in FIG. 7 is performed, for example, when a user inputs an instruction to do a print job.

In step S201, the CPU 11 determines whether the user has authenticated. If the user has authenticated (YES in step S201), the CPU 11 proceeds to step S202. If the user has not authenticated (NO in step S201), the CPU 11 waits until the user has authenticated.

In step S202, the CPU 11 obtains a print job of the authenticated user. A print job of the authenticated user is such a print job that information indicating the authenticated user corresponds to the user ID in the setting information of the print job illustrated in FIG. 5.

In step S203, the CPU 11 determines whether tray information is registered in the setting information of the obtained print job. If tray information is registered in the setting information of the obtained print job (YES in step S203), the CPU 11 proceeds to step S204. If tray information is not registered in the setting information of the obtained print job (NO in step S203), the CPU 11 proceeds to step S212.

In step S204, the CPU 11 determines whether the tray information designates a tray of an image forming apparatus (for example, the parent apparatus 10A) other than the child apparatus 10B. If the tray information designates a tray of an image forming apparatus other than the child apparatus 10B (YES in step S204), the CPU 11 proceeds to step S205. If the tray information does not designate a tray of an image forming apparatus other than the child apparatus 10B, that is, designates a tray of the child apparatus 10B (NO in step S204), the CPU 11 proceeds to step S212.

In step S205, the CPU 11 obtains configuration information of the specified image forming apparatus 10 (parent apparatus 10A).

In step S206, the CPU 11 determines whether the configuration of the child apparatus 10B corresponds to the obtained configuration information (the configuration of the parent apparatus 10A). If the configuration of the child apparatus 10B corresponds to the obtained configuration information (the configuration of the parent apparatus 10A) (YES in step S206), the CPU 11 proceeds to step S212. If the configuration of the child apparatus 10B does not correspond to the configuration indicated by the obtained configuration information (NO in step S206), the CPU 11 proceeds to step S207.

In step S207, the CPU 11 determines whether the configuration of the child apparatus 10B may correspond with the specified tray information. If the configuration of the child apparatus 10B may correspond with the specified tray information (YES in step S207), the CPU 11 proceeds to step S208. If the configuration of the child apparatus 10B fails to correspond with the specified tray information (NO in step S207), the CPU 11 proceeds to step S209.

In step S208, the CPU 11 registers the tray number, which corresponds to the tray information of the print job and which accords with the configuration of the child apparatus 10B, in the tray information, and changes the tray information.

In step S209, the CPU 11 displays a message that the configuration of the child apparatus 10B does not correspond to the tray information of the print job, for notification to the user.

In step S210, the CPU 11 displays the configuration of the child apparatus 10B and the tray information of the print job, and notifies the user of a message that the tray information is to be changed.

In step S211, the CPU 11 receives a tray number of the child apparatus 10B, which is selected by the user, as the tray information of the print job to change the tray information.

In step S212, the CPU 11 executes the print job by applying the tray information of the print job.

As described above, the first exemplary embodiment achieves suppression of output of a result, which a user does not intend to obtain, even when an image forming apparatus 10, having a configuration different from that of a second image forming apparatus 10, executes a print job in which tray information according to the configuration of the second image forming apparatus 10 is registered.

Second Exemplary Embodiment

In the first exemplary embodiment, the case in which the configuration information, which is currently set in the parent apparatus 10A, is obtained is described. In a second exemplary embodiment, the case in which configuration information, which was set in the parent apparatus 10A in the past, is obtained will be described.

The configuration of the image forming system (see FIG. 1) and the exemplary flow, in which a print job is executed (see FIG. 2), according to the second exemplary embodiment are substantially the same as those in the first exemplary embodiment, and will not be described. The hardware configuration of an image forming apparatus 10 (see FIG. 3), the exemplary setting information of a print job (see FIG. 5), and the exemplary configuration information (see FIG. 6) according to the second exemplary embodiment are substantially the same as those in the first exemplary embodiment, and will not be described.

For example, in the flow in FIG. 2, if the configuration of the parent apparatus 10A is changed in the period from a user's transmission of a print job until a child apparatus 10B's execution of the print job, configuration information of the parent apparatus 10A, which the user does not intend to get, is obtained, and such configuration information is applied to execute the print job. In the second exemplary embodiment, the case in which an image forming apparatus 10 stores configuration information indicating the before-change configuration of the image forming apparatus 10 will be described.

Figure 8:
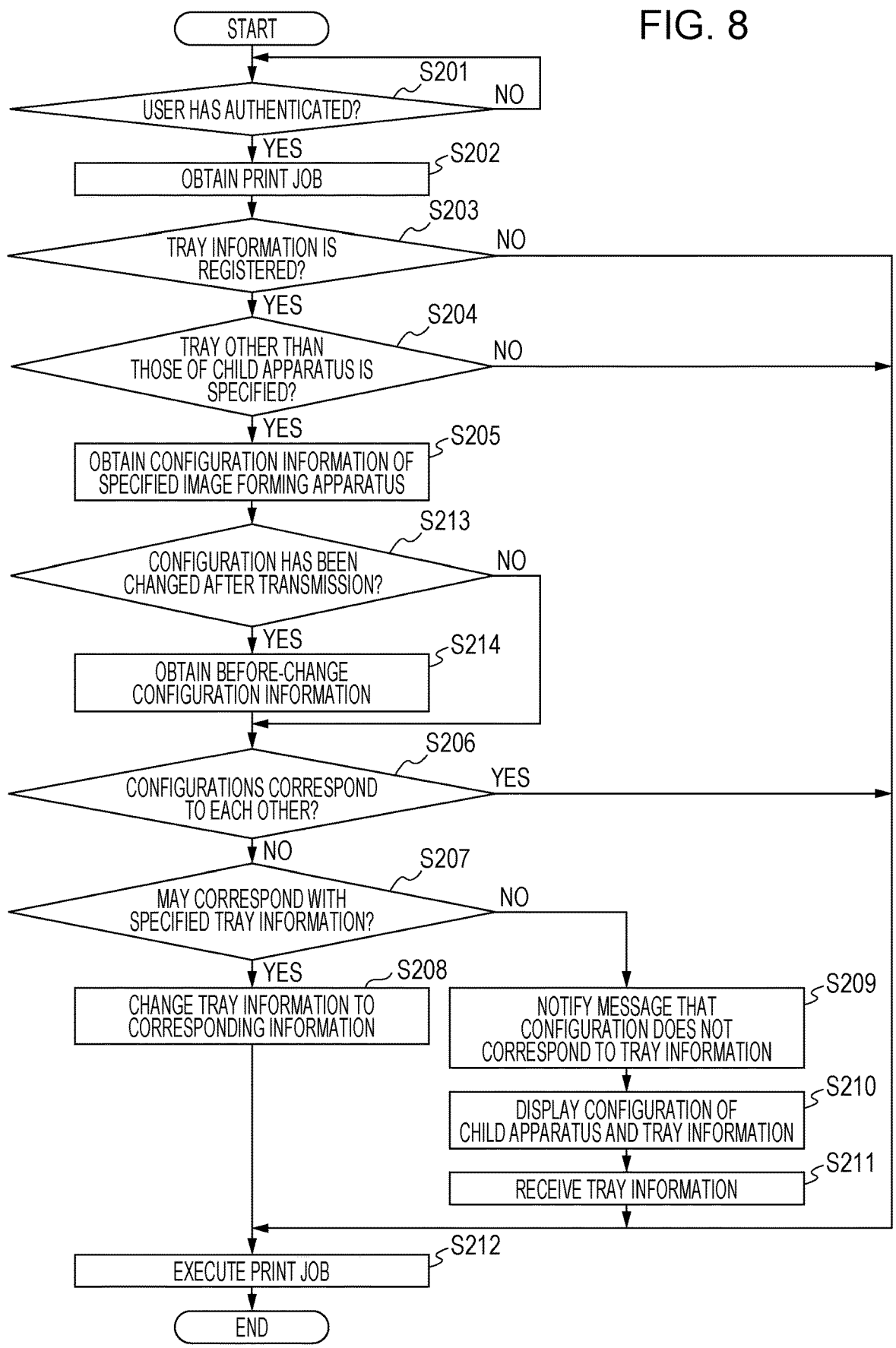
FIG. 8 is a flowchart of an exemplary process of executing a print job, according to a second exemplary embodiment.

By referring to FIG. 8, the operation of a child apparatus 10B (image forming apparatus 10) according to the second exemplary embodiment will be described. FIG. 8 is a flowchart of an exemplary process of executing a print job, according to the second exemplary embodiment. The CPU 11 reads the image forming program from the ROM 12 or the storage 14 for execution. Thus, the image forming process illustrated in FIG. 8 is performed. The image forming process illustrated in FIG. 8 is performed, for example, when a user inputs an instruction to do a print job. In FIG. 8, the same steps as those in the image forming process illustrated in FIG. 7 are designated with the same reference characters, and will not be described.

In step S213, the CPU 11 compares the job setting date-and-time of the setting information of the print job with the update date and time of the configuration information of the parent apparatus 10A, and determines whether the configuration of the parent apparatus 10A has been changed after transmission of the print job. If the configuration of the parent apparatus 10A has been changed after transmission of the print job (YES in step S213), the CPU 11 proceeds to step S214. If the configuration of the parent apparatus 10A has not been changed after transmission of the print job (NO in step S213), the CPU 11 proceeds to step S206.

In step S214, the CPU 11 obtains the before-change configuration information of the specified image forming apparatus 10 (for example, the parent apparatus 10A) as the configuration information.

As described above, the second exemplary embodiment achieves suppression of output of a result, which a user does not intend to obtain, even when the configuration has been changed after transmission of a print job.

In the exemplary embodiments described above, the case in which a print job transmitted from a user is stored in the parent apparatus 10A is described. However, the case is not limited to this. A print job may be stored in a child apparatus 10B, or may be stored in an image forming apparatus 10 selected by a user.

In the exemplary embodiments described above, the case in which a user instructs a child apparatus 10B to do a print job is described. However, the case is not limited to this. A user may instruct the parent apparatus 10A to do a print job. In addition, when a user instructs the parent apparatus 10A to do a print job, the parent apparatus 10A may obtain the print job from a child apparatus 10B.

In the exemplary embodiments described above, the case in which the parent apparatus 10A and the child apparatuses 10B are set in advance is described. However, the case is not limited to this. An image forming apparatus 10, which is frequently used by a user (that is, whose frequency of use is the highest), may be set as the parent apparatus 10A, and may store a print job.

The case in which, when an image forming apparatus 10 according to the exemplary embodiments described above determines that tray information is registered in a print job, the image forming apparatus 10 obtains the configuration information of the specified image forming apparatus 10 is described. However, the case is not limited to this. The image forming apparatus 10 obtains, for storage, the configuration information of other image forming apparatuses 10 in advance. For example, in FIG. 1, the configuration information of the parent apparatus 10A connected to the network N and the child apparatuses 10B belonging to the parent apparatus 10A may be obtained in advance for storage. In addition, in response to the parent apparatus 10A storing a print job, the parent apparatus 10A may specify the specified image forming apparatus 10 from the tray information of the print job, and may transmit the configuration information of the specified image forming apparatus 10 to all the child apparatuses 10B, which are connected to the network N, to store the transmitted information in the child apparatuses 10B.

In the exemplary embodiments described above, the case in which the job setting date-and-time of a print job is compared with the update date and time of the configuration information to detect that the configuration has been changed is described. However, the case is not limited to this. Configuration information stored in advance may be used to detect that the configuration has been changed. For example, an image forming apparatus 10 stores, in advance, the configuration information of each image forming apparatus 10 connected to the network N in FIG. 1. In execution of a print job, the image forming apparatus 10 obtains the configuration information indicating the configuration which is currently set in the specified image forming apparatus 10, compares the obtained configuration information with the configuration information stored in advance, and detects that the configuration has been changed.

In the exemplary embodiments described above, the case in which, when the configuration of an image forming apparatus fails to correspond with the specified tray information, the tray information of the print job is changed is described. However, the case is not limited to this. A message that the configuration of the image forming apparatus is to be changed may be notified. For example, when tray information designates "parent apparatus tray 1" as illustrated in FIG. 5, the sheet size "A4" and the setting sheet "plain paper", which correspond to "parent apparatus tray 1", may be specified from the configuration information in FIG. 6, and a message that A4 plain paper is to be set in tray 1 of the image forming apparatus may be notified.

As described above, the exemplary embodiments are used to describe the present disclosure. However, the present disclosure is not limited to the scope described in the exemplary embodiments. Various changes and improvements may be made to the exemplary embodiments without departing from the gist of the present disclosure. Embodiments obtained by adding the changes and the improvements are also encompassed in the technical scope of the present disclosure.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiments, the case in which the image forming program is installed in a storage is described. However, the case is not limited to this. The image forming program according to the exemplary embodiments may be provided by recording the image forming program in a computer-readable storage medium. For example, the image forming program according to the exemplary embodiments of the present disclosure may be provided by recording the image forming program in an optical disc, such as a compact disc (CD)-ROM or a digital versatile disc (DVD)-ROM. The image forming program according to the exemplary embodiments of the present disclosure may be provided by recording the image forming program in a semiconductor memory, such as a Universal Serial Bus (USB) memory or a memory card. The image forming program according to the exemplary embodiments may be obtained from an external apparatus through a communication line connected to the communication I/F.

What is claimed is:

1. An image forming apparatus comprising:
   a processor configured to:
      obtain a print job in which setting-tray information is registered,
         wherein the setting-tray information describes a specific tray of a second image forming apparatus, and
         wherein the second image forming apparatus is different from the image forming apparatus; and
      execute the print job by applying tray information,
         wherein the tray information corresponds to the setting-tray information, and
         wherein the tray information describes a specific tray of the image forming apparatus.

2. The image forming apparatus according to claim 1, wherein the processor is configured to:
   further obtain configuration information about a configuration of the second image forming apparatus; and,
   if the obtained configuration information corresponds to a configuration of the image forming apparatus, execute the print job by applying the setting-tray information.

3. The image forming apparatus according to claim 2, wherein the processor is configured to:
   if the obtained configuration information does not correspond to the configuration of the image forming apparatus, determine whether the setting-tray information is allowed to be changed to tray information according to the configuration of image forming apparatus; and,
   if the setting-tray information is allowed to be changed, execute the print job by applying the tray information according to the configuration of the image forming apparatus.

4. The image forming apparatus according to claim 2, wherein the processor is configured to:
   after the setting-tray information is registered in the print job, if the configuration of the second image forming apparatus is changed, obtain before-change configuration information about a before-change configuration of the second image forming apparatus as the configuration information, the before-change configuration being a configuration before the change.

5. The image forming apparatus according to claim 3, wherein the processor is configured to:
   after the setting-tray information is registered in the print job, if the configuration of the second image forming apparatus is changed, obtain before-change configuration information about a before-change configuration of the second image forming apparatus as the configuration information, the before-change configuration being a configuration before the change.

6. The image forming apparatus according to claim 1, wherein the processor is configured to:
   if the tray information is not allowed to be applied at the image forming apparatus, notify a message that the configuration of the image forming apparatus does not correspond to the setting-tray information.

7. The image forming apparatus according to claim 2, wherein the processor is configured to:
   if the tray information is not allowed to be applied at the image forming apparatus, notify a message that the configuration of the image forming apparatus does not correspond to the setting-tray information.

8. The image forming apparatus according to claim 3, wherein the processor is configured to:
   if the tray information is not allowed to be applied at the image forming apparatus, notify a message that the configuration of the image forming apparatus does not correspond to the setting-tray information.

9. The image forming apparatus according to claim 4, wherein the processor is configured to:
   if the tray information is not allowed to be applied at the image forming apparatus, notify a message that the configuration of the image forming apparatus does not correspond to the setting-tray information.

10. The image forming apparatus according to claim 5, wherein the processor is configured to:
    if the tray information is not allowed to be applied at the image forming apparatus, notify a message that the configuration of the image forming apparatus does not correspond to the setting-tray information.

11. The image forming apparatus according to claim 1, wherein the processor is configured to:
    if a configuration of the second image forming apparatus according to the setting-tray information is different from a configuration of the image forming apparatus, display the setting-tray information of the print job and configuration information of the image forming apparatus.

12. The image forming apparatus according to claim 2, wherein the processor is configured to:
    if the configuration of the second image forming apparatus according to the setting-tray information is different from the configuration of the image forming apparatus, display the setting-tray information of the print job and configuration information of the image forming apparatus.

13. The image forming apparatus according to claim 3, wherein the processor is configured to:
    if the configuration of the second image forming apparatus according to the setting-tray information is different from the configuration of the image forming apparatus, display the setting-tray information of the print job and configuration information of the image forming apparatus.

14. The image forming apparatus according to claim 4, wherein the processor is configured to:
    if the configuration of the second image forming apparatus according to the setting-tray information is different from the configuration of the image forming apparatus, display the setting-tray information of the print job and configuration information of the image forming apparatus.

15. The image forming apparatus according to claim 5, wherein the processor is configured to:
    if the configuration of the second image forming apparatus according to the setting-tray information is different from the configuration of the image forming apparatus, display the setting-tray information of the print job and configuration information of the image forming apparatus.

16. The image forming apparatus according to claim 11, wherein the processor is configured to:
    if the setting-tray information of the print job does not correspond to configuration information of the image forming apparatus, notify a message that a configuration of the image forming apparatus is to be changed.

17. The image forming apparatus according to claim 11, wherein the processor is configured to:
    receive a change of the displayed setting-tray information; and
    execute the print job by applying the received change.

18. The image forming apparatus according to claim 1, wherein the processor is configured to:
    store configuration information of the second image forming apparatus in advance;
    use the stored configuration information to determine whether a configuration of the second image forming apparatus corresponds to a configuration of the image forming apparatus; and,
    if the configuration of the second image forming apparatus corresponds to the configuration of the image forming apparatus, execute the print job by applying the setting-tray information.

19. A non-transitory computer readable medium storing a program causing a computer to execute a process for image formation, the process being performed by an image forming apparatus, the process comprising:
    obtaining a print job in which setting-tray information is registered,
        wherein the setting-tray information describes a specific tray of a second image forming apparatus, and
        wherein the second image forming apparatus is different from the image forming apparatus; and
    executing the print job by applying tray information,
        wherein the tray information corresponds to the setting-tray information, and
        wherein the tray information describes a specific tray of the image forming apparatus.

20. An image forming method performed by an image forming apparatus, the image forming method comprising:
    obtaining a print job in which setting-tray information is registered,
        wherein the setting-tray information describes a specific tray of a second image forming apparatus, and
        wherein the second image forming apparatus is different from the image forming apparatus; and
    executing the print job by applying tray information,
        wherein the tray information corresponds to the setting-tray information; and
        wherein the tray information describes a specific tray of the image forming apparatus.

* * * * *